United States Patent [19]

Evans et al.

[11] Patent Number: 4,667,701
[45] Date of Patent: May 26, 1987

[54] NOZZLE DAM ASSEMBLY

[75] Inventors: Cliff Evans, West Redding, Conn.; Alvaro Obligado, Waccabuc; Louis J. Zezza, Ossinging, both of N.Y.

[73] Assignee: Nuclear Energy Systems, Inc., Danbury, Conn.

[21] Appl. No.: 686,686

[22] Filed: Dec. 27, 1984

[51] Int. Cl.[4] .................. F16L 55/12; G21C 13/06
[52] U.S. Cl. ..................... 138/93; 138/89; 220/314; 376/204
[58] Field of Search ............... 138/92, 93, 89; 220/212, 314; 376/204

[56] References Cited

U.S. PATENT DOCUMENTS

| | | | |
|---|---|---|---|
| 1,893,979 | 1/1933 | Barrere | 138/93 X |
| 3,537,483 | 11/1970 | Teaue, Jr. | 138/93 |
| 3,774,646 | 11/1973 | Smith | 138/93 |
| 4,207,706 | 6/1980 | Haines | 220/314 X |
| 4,482,076 | 11/1984 | Wentzell | 138/93 X |
| 4,483,457 | 11/1984 | Schukei et al. | 138/93 X |
| 4,505,295 | 3/1985 | Quin et al. | 138/93 X |
| 4,518,015 | 5/1985 | Fischer | 138/93 |
| 4,519,519 | 5/1985 | Meuschke et al. | 220/314 X |

OTHER PUBLICATIONS

Radiological Experiences With Steam Generator Nozzle Dam Installations at Salem Nuclear Generation Station, Britz, Bergendahl & Steed, Oct. 1983, pp. 65–76.
Products and Services to Improve PWR Steam Generator Maintenance, Alden/Kosky, Apr. 1983, pp. 1–8.

*Primary Examiner*—Henry K. Artis
*Assistant Examiner*—Mark Thronson
*Attorney, Agent, or Firm*—Charles J. Brown

[57] ABSTRACT

In a nozzle dam assembly wherein a flange ring is affixed around a circular nozzle opening in a chamber wall, a support frame spans and is in non-threaded connection with the ring by releasable pins which carry under tension any load on the frame directed axially out of the nozzle into the chamber, and a circular dam with a sealing diaphragm disposed over it is attachable to the frame with its rim within the nozzle so that inflatable peripheral sealing means on the diaphragm effect the desired seal of the nozzle independent of the aforementioned axial load.

17 Claims, 24 Drawing Figures

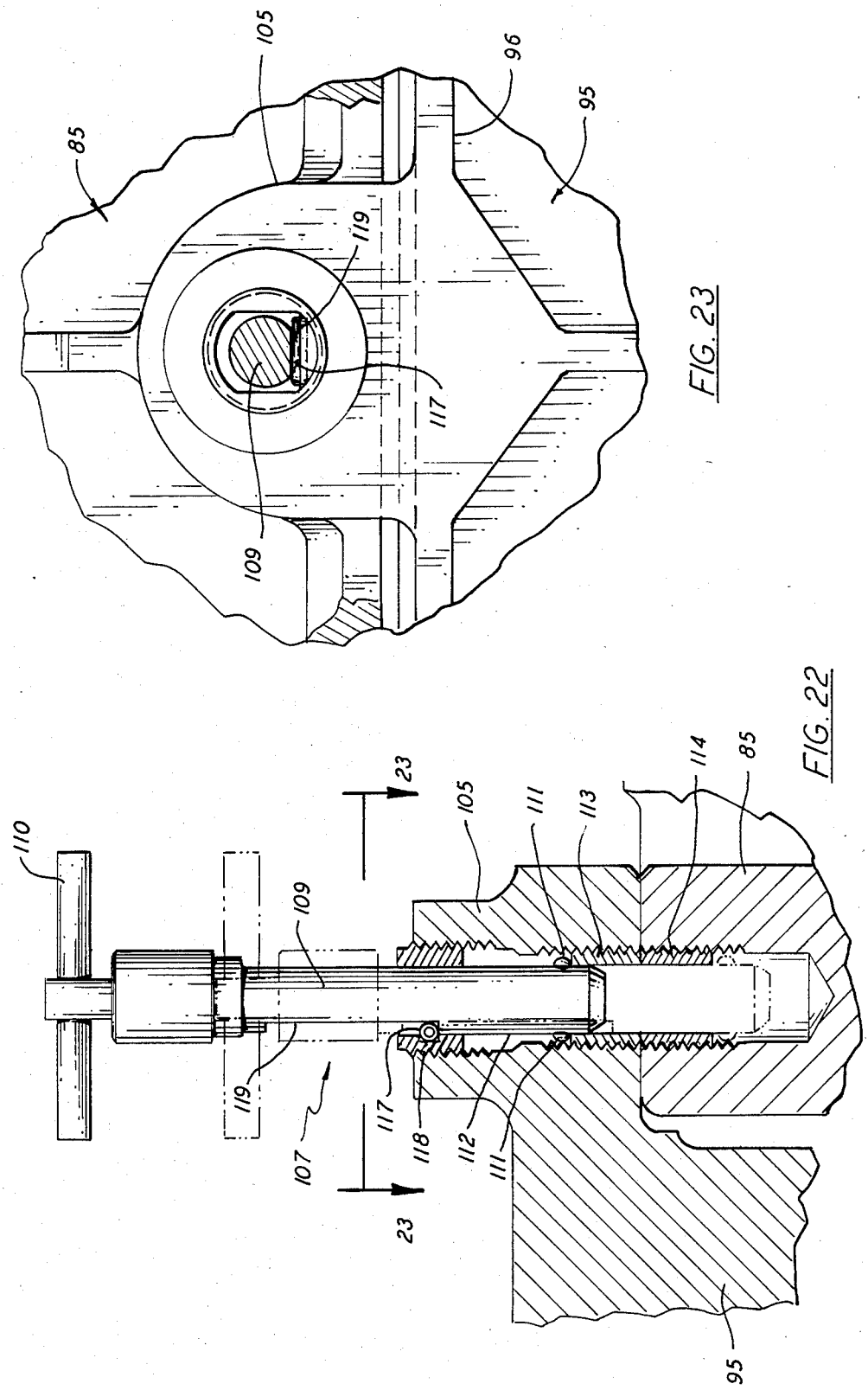

NOZZLE DAM ASSEMBLY

BACKGROUND OF THE INVENTION

Nuclear power plants are periodically shut down for refueling, maintenance and intensive inspection and testing, and wherever possible these functions are to be carried out simultaneously rather than sequentially to minimize outage time. Since the reactor pressure vessel and refueling pool are flooded with water during refueling, some form of temporary seal must be installed in the piping connecting the reactor vessel with the generator in order to isolate that pool from the steam generator and permit concurrent testing and inspection of the generator components. This seal is achieved by installing what is known in the industry as a nozzle dam in the nozzles of the steam generator primary head. Its design should be such that its parts can be carried through a small manway in the generator head and assembled by hand very quickly to minimize personnel radiation exposure. It also must effect a reliable water-tight seal without compromising the structural integrity of the nozzle wall or steam generator wall.

One form of nozzle dam is described in a paper presented at the American Power Conference in Chicago, Ill. in April of 1983 by John W. Alden and Richard P. Kosky. It requires that a ring of radial holes be drilled in the nozzle wall just inside the opening into the generator. The dam itself is assembled in segments (two or three) inside the generator and includes a membrane with an inflatable peripheral seal. It is releasably secured in place by radial locking pins which enter inserts in the drilled holes in the nozzle wall. A major shortcoming of this form of nozzle dam is the use of drilled holes which have the potential at least of weakening the nozzle wall. Stress analyses must be performed after the holes are drilled to insure that the nozzle wall structural integrity has not been compromised. Also the pins are under a shear load from the hydrostatic water pressure.

Another form of nozzle dam is described in the October 1983 issue of the journal Radiation Protection Management, in an article at pages 65 to 76 entitled "Radiological Experiences with Steam Generator Nozzle Dam Installations at Salem Nuclear Generator Station" by W. L. Britz and H. W. Bergendahl. This design avoids holes in the nozzle wall by using a permanently welded-in-place flange ring affixed to the inside of the generator bowl around the opening of the nozzle. A rubber diaphragm is placed over the flange ring and is overlaid by a 70-pound folding circular cover bolted onto the ring through the edge of the diaphragm by twenty bolts. Among the disadvantages of this design is the use of threaded bolt holes which can be subject to galling. Since the holes in the ring are permanently in the generator they may require cleaning before use. This adds a step to the dam installation procedure and thus increases personnel radiation exposure time. It is also quite time-consuming to screw in the circle of bolts. Another reported problem of this design is that the flange ring is not always sufficiently flat to permit a uniform sealing pressure on the diaphragm.

. It is the purpose of the present invention to provide a new design of nozzle dam which avoids the drilling of holes in the nozzle wall or generator wall, which involves no threaded bolt holes permanently in the generator, and which permits a uniform pressure seal regardless of irregularities in flatness of a flange ring around the nozzle opening.

SUMMARY OF THE INVENTION

In a nozzle dam assembly wherein a flange ring is affixed to a chamber wall around an opening of a nozzle of circular cross section, the improvement of the invention comprises a support frame adapted to span the ring. Releasable pin means are included for making a non-threaded connection between the frame and ring and for carrying under tension any load on the frame directed axially out of the nozzle into the chamber. A circular dam is provided which is attachable to the frame with a rim within the nozzle. A sealing diaphragm is disposable over the dam and around its rim. Inflatable peripheral sealing means on the diaphragm are disposable around the dam rim for effecting a continuous circumferential seal around the nozzle independent of the aforementioned axial load.

In contrast to prior art devices the apparatus of the invention involves no drilling of the nozzle or generator wall and therefore no stress analyses are required to determine if the integrity of the supporting structure has been compromised. No bolted connections with the flange ring are involved and hence thread-cleaning requirements are eliminated and there is no possibility of galling during installation and removal. The sealing action of the dam is unaffected by any minor flatness variation in the flange ring. The peripheral seal is effected radially in the nozzle independent of the hydrostatic load on the support frame (directed axially out of the nozzle into the chamber) and that hydrostatic load is carried by the pin means under tension rather than shear. The installation time of a nozzle dam assembly of the invention in a nuclear power plant steam generator is less than five minutes, which is an important consideration due to the high radiation levels in the steam generator.

As a subcombination, in a nozzle dam assembly wherein a flange ring is affixed to a chamber wall around an opening of a nozzle of circular cross section and a dam with a sealing diaphragm is attachable to the ring to seal the opening, the invention provides a collapsible support frame for the dam. The frame comprises cross bars adapted to span the ring and cross arms pivotably and pantographically attached to the cross bars. Releasable pin means are included as described above and they comprise respective bayonet pins on the ends of the cross bars adapted when the dam is assembled and in place to be parallel to the nozzle axis.

As another subcombination, in a nozzle dam assembly wherein a flange ring is affixed to a chamber wall around an opening of a nozzle of circular cross section, support frame cross bars are adapted to be releasably connected to and span the ring, and a sealing diaphragm is adapted to seal the opening, the invention provides a circular dam to which the sealing diaphragm is attachable. The dam comprises at least two segments and locating means are included on the segments for correctly positioning them in registry during assembly. The dam also includes on the segments quick-disconnect lock means and load-transmitting stud means for carrying under compression any load directed axially out of the nozzle into the chamber. Also provided in this subcombination in accordance with the invention are bracket means on the frame on which the dam segments are attachable during assembly.

BRIEF DESCRIPTION OF THE DRAWINGS

FIG. 22 is a fragmentary enlarged section of one ball-lock pin for interconnecting the dam segments and showing the unlocked position in solid lines and the locked position in dotted lines;

FIG. 23 is a section taken along the line 23—23 of FIG. 22; and

DESCRIPTION OF PREFERRED EMBODIMENT

Figure 1:
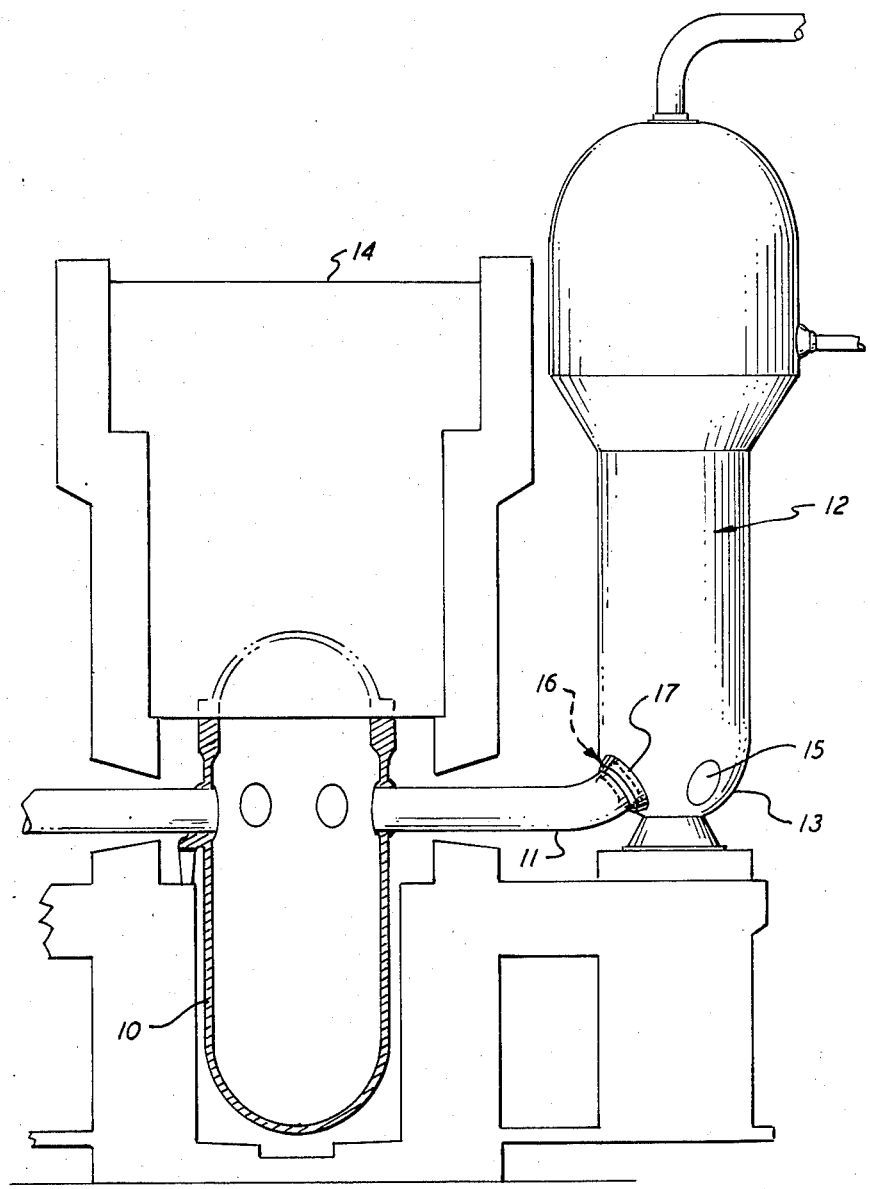
FIG. 1 is an elevation of a typical nuclear reactor and steam generator showing the nozzle dam location.
Figure 2:
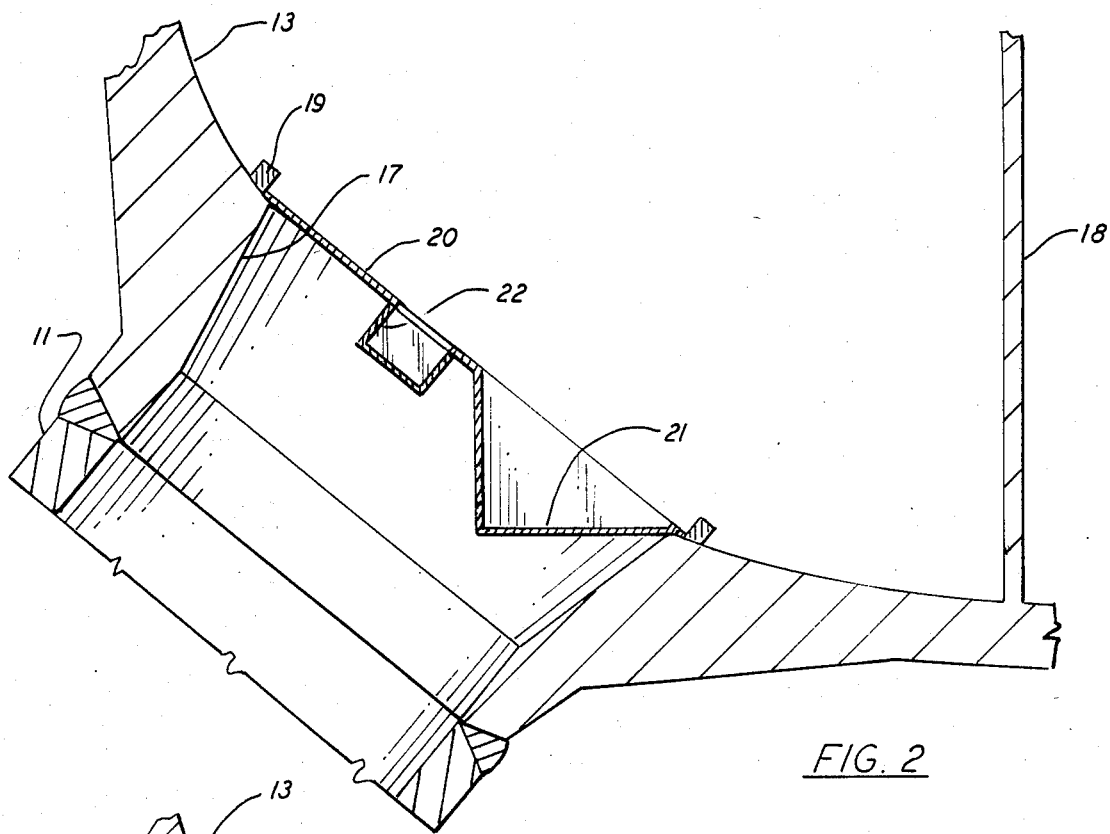
FIG. 2 is an enlarged fragmentary vertical section through the opening of the nozzle into the steam generator bowl with the flange ring and a temporary parts catcher in place.

In FIG. 1, a typical pressurized water reactor 10 is shown connected by a pipe 11 of circular cross section with a steam generator 12 having a lower head 13 of spherical shape. This head 13 is one form of what is generically referred to herein as a "chamber". During the plant shutdowns mentioned previously the reactor 10 in its refueling pool is flooded for purposes of refueling with water to the level is indicated at 14. Before the flooding takes place personnel enter the head 13 through a manway 15, which is only approximately sixteen inches in diameter, and put together and install a dam assembly 16 which temporarily seals the generator 12 from entry of water. The dam assembly is to effect the seal at a nozzle 17 wherein the pipe 11 opens into the head 13, a location well below the water level 14. There are high radiation levels within the confines of the generator head 13 and hence the dam 16 should be designed for the fastest possible assembly and later dismantling. Yet it must be brought in in pieces because it must seal a nozzle of from thirty to forty-two inches in diameter, about twice as much or more as the manway diameter.

FIGS. 2 through 9 illustrate the general steps in the installation of a nozzle dam assembly 16 pursuant to the invention. In each the end portion of the pipe 11 is shown opening through the flared nozzle 17 of circular cross section into the spherical lower head 13 of the steam generator 12. The confinement within the head is made even worse by a partition 18.

A flange ring 19 is permanently welded on the inside surface of the head concentric with the circular opening defined by the nozzle 17. Its underface may be bevelled to lie flush with the head surface. This flange ring 19 is to be left permanently in place. It is to be constructed of stainless steel.

The first step in the installation sequence is to place a parts catcher 20 over the opening of the nozzle 17 within the flange ring 19. The catcher 20 prevents loose parts from inadvertently entering the nozzle 17 and, in addition, by means of an indentation 21 formed therein, provides a convenient step or footrest on which the operator working within the steam generator may stand. The parts catcher 20 is hinged in three sections to allow entry through the relatively small manway 15. An additional indentation 22 is also provided in the parts catcher for clearance of other elements of the assembly dam as will be clear from the following description.

Figure 3:
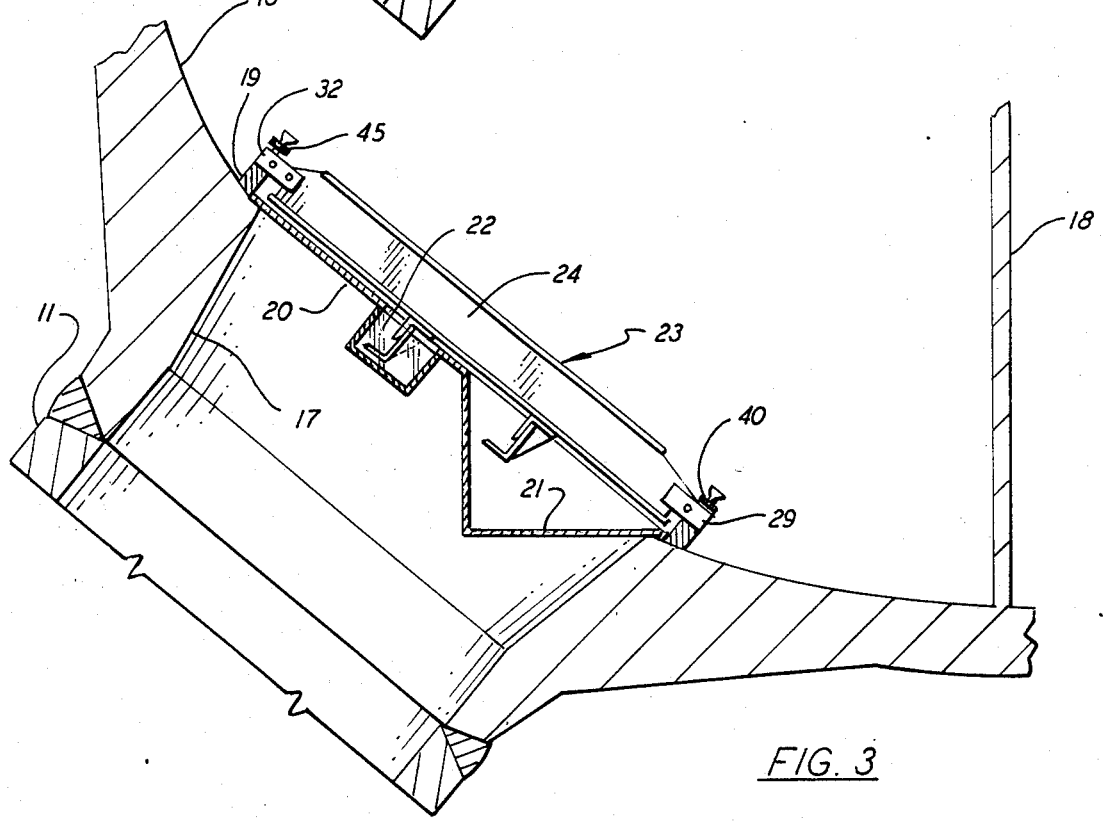
FIG. 3 is a similar view showing the support frame with certain of the bayonet pins locked.
Figure 10:
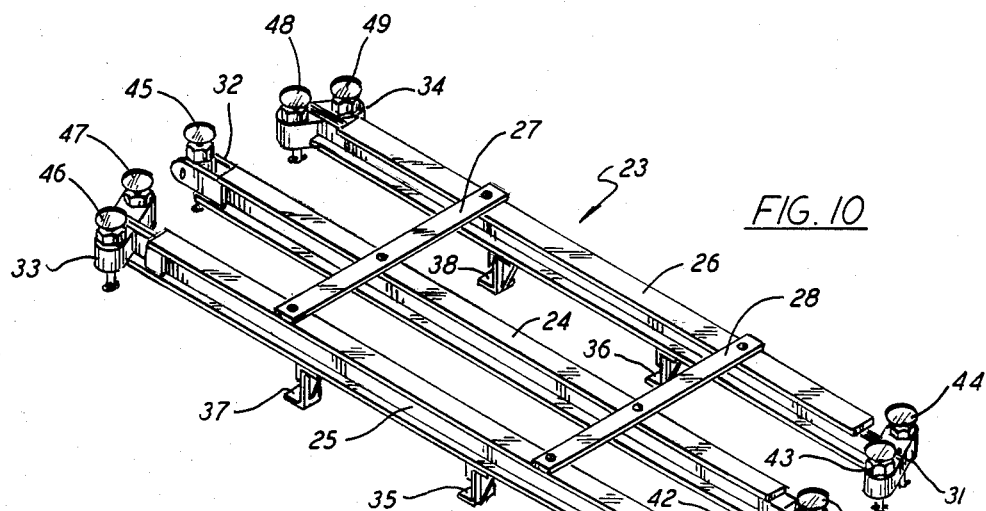
FIG. 10 is a perspective view of the support frame with its releasable pin means.

Turning now to FIGS. 3 and 10, the next step in sequence is the installation of a collapsible support frame 23. It consists of a central cross bar 24 adapted to span the diameter of the ring 19 and two outer cross bars 25 and 26 to each side of it adapted to span chords of the ring 19. A pair of cross arms 27 and 28 are pivotably connected in the manner of a pantograph to the three cross bars 24 to 26 as shown in FIG. 10. The cross bars 24 to 26 are of a suitable cross section such as that of an I-beam and each of them and the cross arms 27 and 28 is preferably of aluminum. At one end of the cross bars 24 to 26, hereinafter referred to as their lower end, the bars are hinged to mountings 29 to 31 respectively. At the other end of the cross bars 24 to 26, hereinafter referred to as their upper end, the cross bars are attached without hinges to mountings 32 to 34 respectively. Lower angle brackets 35 and 36 and upper angle brackets 37 and 38 extend from the cross bars 25 and 26 respectively as shown in FIG. 10.

Releasable attachment means are provided for anchoring the support frame 23 with respect to the ring 19. In particular the lower mounting 29 of the central cross bar 24 has bayonet pin means 40, the lower mounting 30 on the outer cross bar 25 has double bayonet pin means 41 and 42, and the lower mountings 31 on the other outer cross bar 26 has double bayonet means 43 and 44. At the upper end of the central cross arm 24 the mounting 32 has single bayonet pin means 45, at the upper end of the outer cross arm 25 the mounting 33 has double bayonet pin means 46 and 47, and at the upper end of the other outer cross arm 26 the mounting 34 has double bayonet pin means 48 and 49.

Broadly stated "bayonet pin means" is intended to cover pin-type connectors which do not involve a threaded socket in the ring 19. In a preferred form, each of the bayonet pin means 40 to 44 and 45 to 49 is of the design shown in more detail in FIGS. 13 to 19 (i.e. bayonet pin means 45). It cooperates with an insert 52 threaded into the flange ring 19. A threaded shaft 53 has a wing element 54 affixed to its upper end for rotation and insertion and it carries two threaded upper and lower nuts 55 and 56. Between the lower nut 56 and a washer 57 is a compression spring 58. The shaft 53 is located within a hole 60 formed in the mounting 32.

Figure 14:
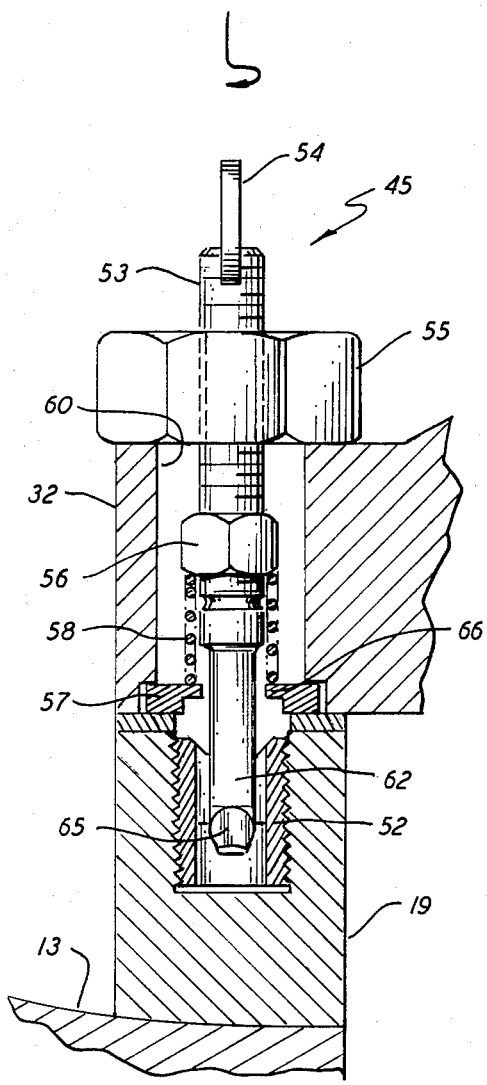
FIG. 14 is a view similar to FIG. 13 showing the bayonet pin means in locked position.
Figure 15:
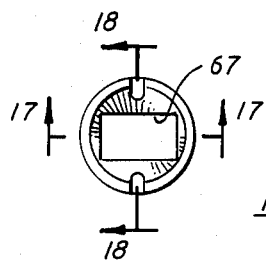
FIG. 15 is a top plan view of the socket insert.
Figure 18:
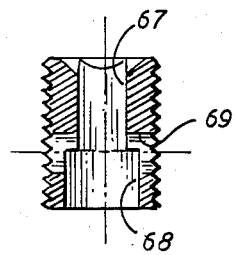
FIG. 18 is a vertical section taken along the line 18—18 of FIG. 15.
Figure 17:
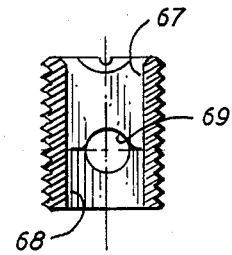
FIG. 17 is a vertical section taken along the line 17—17 of FIG. 15.

Projecting from the lower end of the threaded shaft 53 is an unthreaded shank 62 at the lower end of which is a tee-head 63 having rounded opposite end faces 64 and 65. In lateral cross section the tee-head 63 is circular as can be seen in FIG. 14. An inner lip 66 on the washer 57 prevents the tee-head 63 from moving upwardly under the bias of the compression spring 58 beyond the position shown in FIG. 13. Hence the bayonet pin means is irremovably attached to its cross arm.

The socket insert 52 has no threads on its interior and thus it is referred to as "non-threaded" even though its exterior is threaded for mounting in the ring 19 is shown in detail in FIGS. 15 to 19. Note that flange rings with threaded holes are commonly present in existing equipment and the insert 52 serves to retro-fit such rings so that they permit the "non-threaded" connection characterizing the present design. The socket 52 includes an upper rectangular hole 67 through which the tee-head 63 can pass. In the lower end of the socket insert 52 is a wider circular hole 68. A circular cross hole 69 extends completely through the insert intersecting the lower portion of the upper hole 67 and the upper portion of the lower hole 68.

Figure 19:
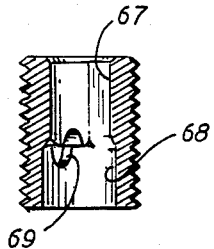
FIG. 19 is a vertical section taken along the line 19—19 of FIG. 16.
Figure 16:
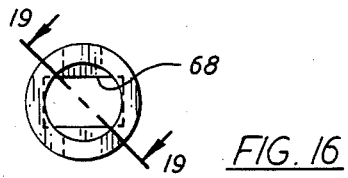
FIG. 16 is a bottom plan view of the socket insert.

In operation the bayonet pin 45 is pushed downwardly against the force of the spring 58 so that the tee-head 63 passes through the upper hole 67 of the insert 63 and down into the lower hole 68. In that lower position the pin is turned by means of the wing 54 so that the tee-head 63 becomes aligned with the hole 69 and the spring 58 then raises the tee-head slightly to come to rest in locked position as shown in FIG. 14. FIG. 19 illustrates a slightly flared zone of transition between the upper hole 67 and the lower hole 68 to aid in this rotation of the tee-head 63 into its locked position.

It will be seen that the bayonet pin and socket insert permit a quick interconnection between the support frame 23 and the ring 19 on the wall of the steam generator without the use of threaded holes in the nozzle wall or generator and hence the structural integrity of those walls is not impaired. Also galling within threads and all of the problems attendant to dirt in thread holes are avoided.

Ten socket inserts are appropriately spaced in sets of five at opposite portions of the flange ring 19 to receive the ten bayonet pins at the ends of the cross bars shown in FIG. 10. The cross bars and cross arms of the collapsable support frame 23 are preferably of aluminum as noted previously and the bayonet pin means and socket inserts are preferably of stainless steel. The support frame 23 with the ten bayonet pin means weigh approximately thirty-four pounds and therefore can readily be carried manually into the steam generator head 13 through the manway 15.

Figure 4:
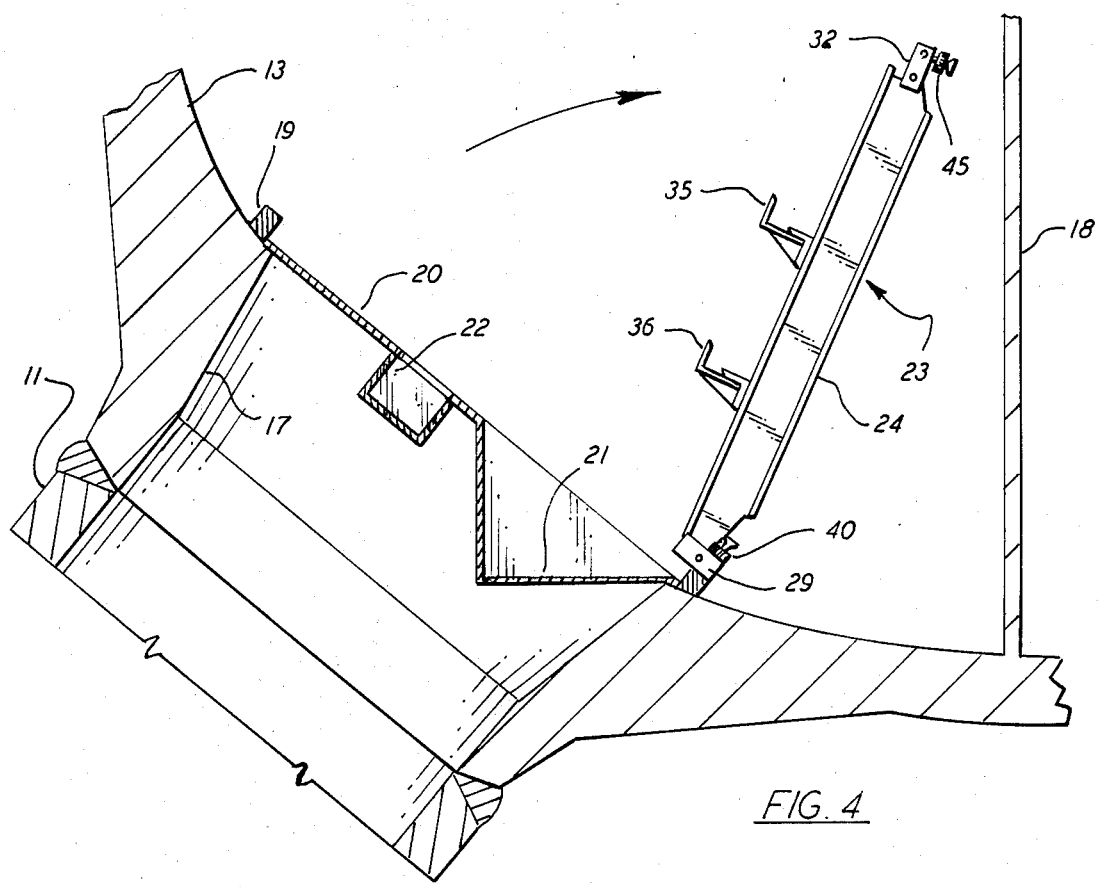
FIG. 4 is a similar view showing the support frame rotated upwardly.
Figure 5:
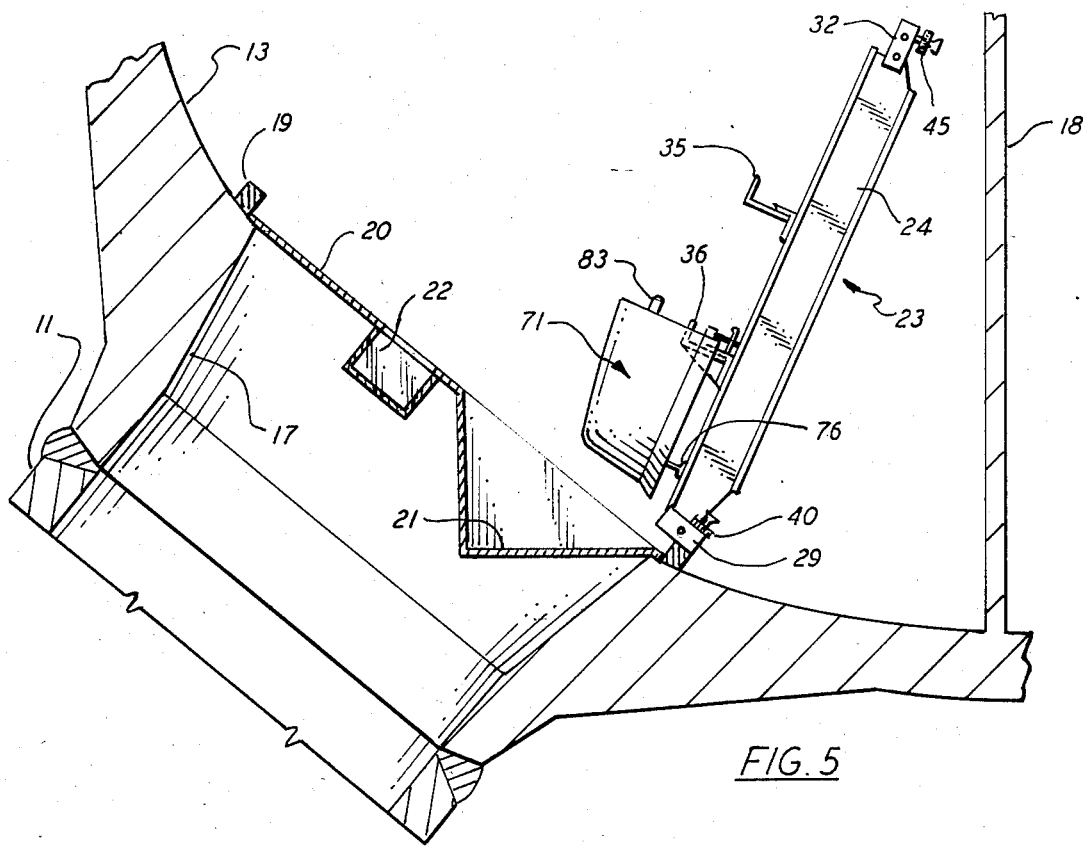
FIG. 5 is a similar view showing the lower dam segment in place on the support frame.
Figure 20:
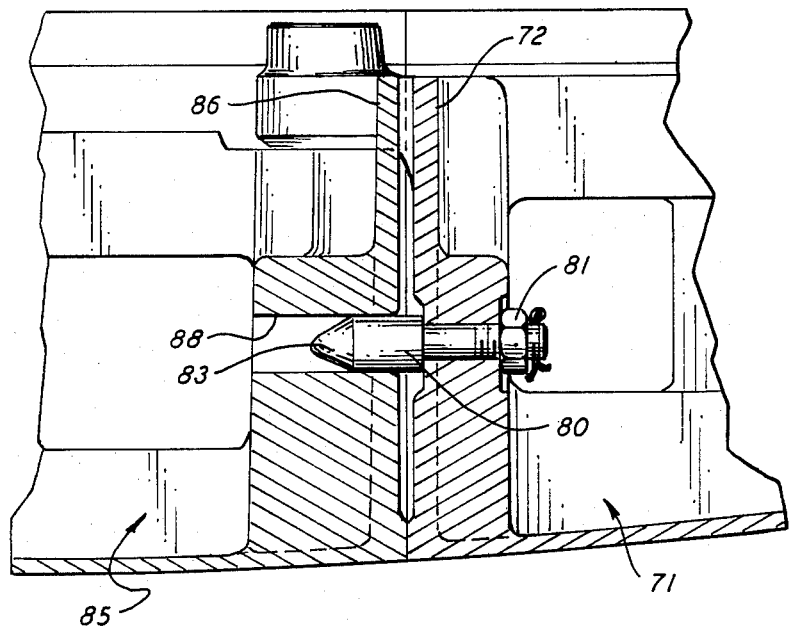
FIG. 20 is an enlarged fragmentary section of one positioning finger for the dam segments taken along the line 20—20 of FIG. 11.

By means of the hinged lower ends of the cross bars 25 to 27, the support frame 23 is next rotated upwardly past dead center to the FIG. 4 position. In that stable position the support frame is ready to receive a lower dam segment 71 as shown in FIG. 5. Assembled with the other dam segments described below, the dam segment 71 appears in FIG. 11. In its straight wall 72 a pair of slots 73 and 74 are formed to receive the brackets 35 and 36 so that the lower dam segment 71 hangs in place transverse to the cross bars 23 to 25 on those brackets as shown in FIG. 5. To maintain its lower end properly spaced from the supporting frame 23, and to transmit under compression any load on the frame 23 directed axially out of the nozzle 17 into the head 13, three studs 76 (one of which is visible in FIG. 5) are positioned in respective holes 77, 78 and 79. As shown in FIG. 20 a positioning finger 80 is secured by a shaft and nut 81 to the wall 72 and has a conical projecting end 82 for locating purposes described below.

Figure 6:
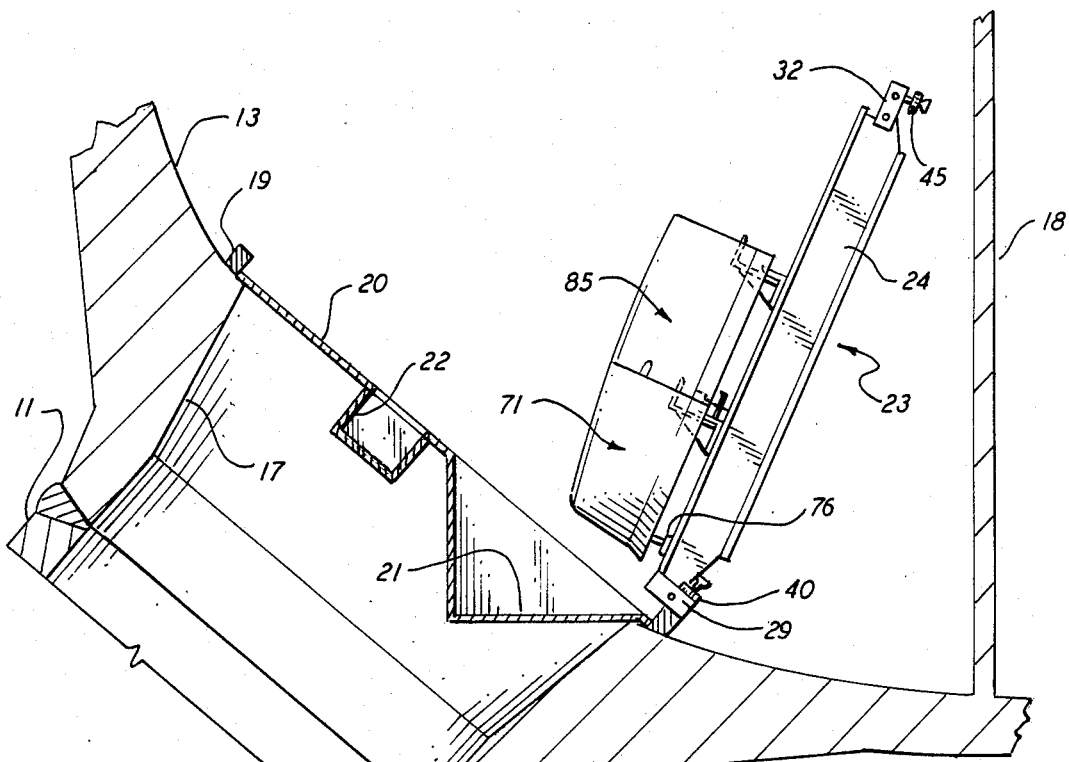
FIG. 6 is a similar view showing the central dam segment in place on the support frame.
Figure 11:
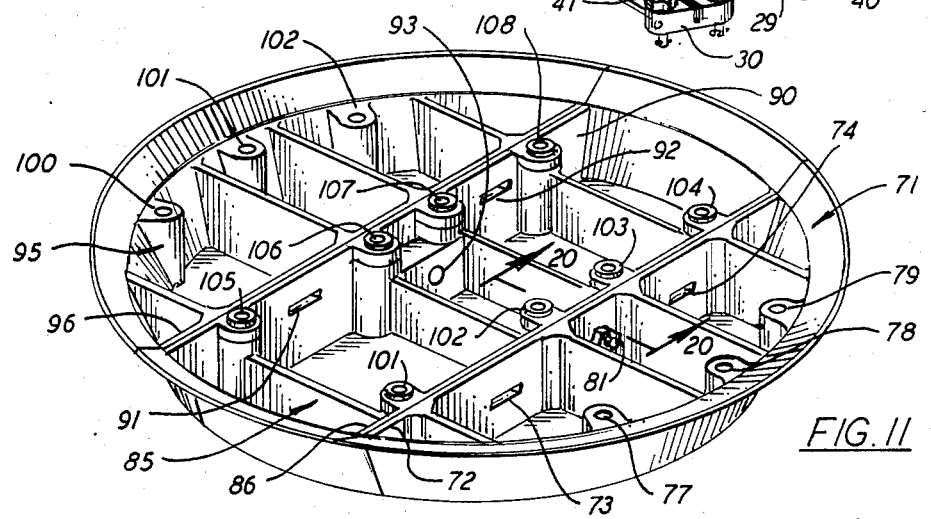
FIG. 11 is a perspective view of the assembled dam segments (note that it is in exploded relation to FIGS. 9 and 10)

The next step in the assembly sequence is the addition of a central dam segment 85 illustrated in FIGS. 6 and 11. It has a lower straight wall 86 which registers with the wall 72 of the lower dam segment 71 transverse to the cross bars 23 to 25, and a pair of slots not visible in the drawings formed in that wall 86 register with the slots 73 and 74 of the lower dam segment wall 72. The brackets 35 and 36 therefore extend through the slots in the middle dam segment wall 86. As shown in the section of FIG. 20, the locating finger 80 on the lower dam segment 71 projects into a locating hole 88 in the middle dam segment wall 86 to position the dam segments 71 and 85 in proper relationship.

As shown in FIG. 11, one straight wall 90 of the central dam segment 85 is formed with slots 91 and 92 to receive the brackets 37 and 38 on the cross bars 25 and 26 of the support frame 23. A positioning finger is centrally located in the wall 90 of the central dam segment and includes a nut 93 similar to the nut 81 on the lower dam segment 71.

Figure 7:
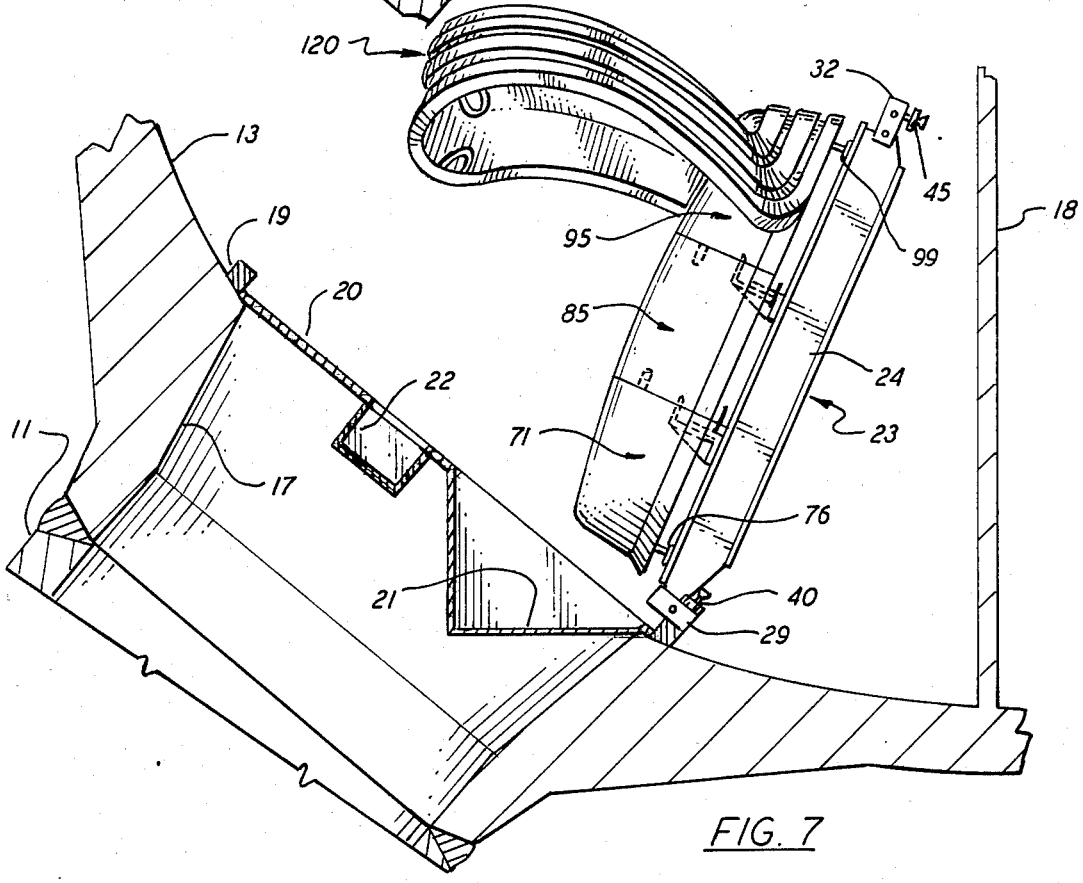
FIG. 7 is a similar view showing the upper dam segment in place together with its preattached sealing diaphragm.
Figure 8:
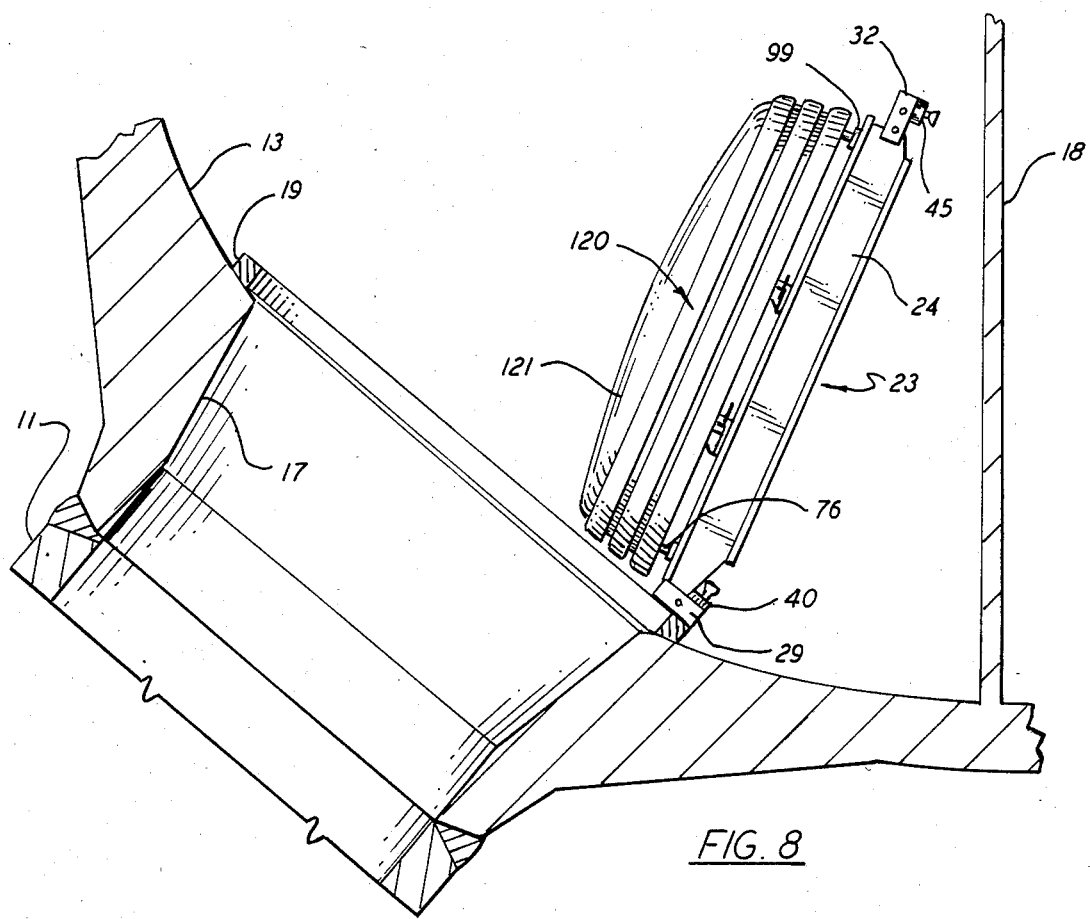
FIG. 8 is a similar view with the diaphragm stretched onto the dam and the temporary parts catcher removed.
Figure 21:
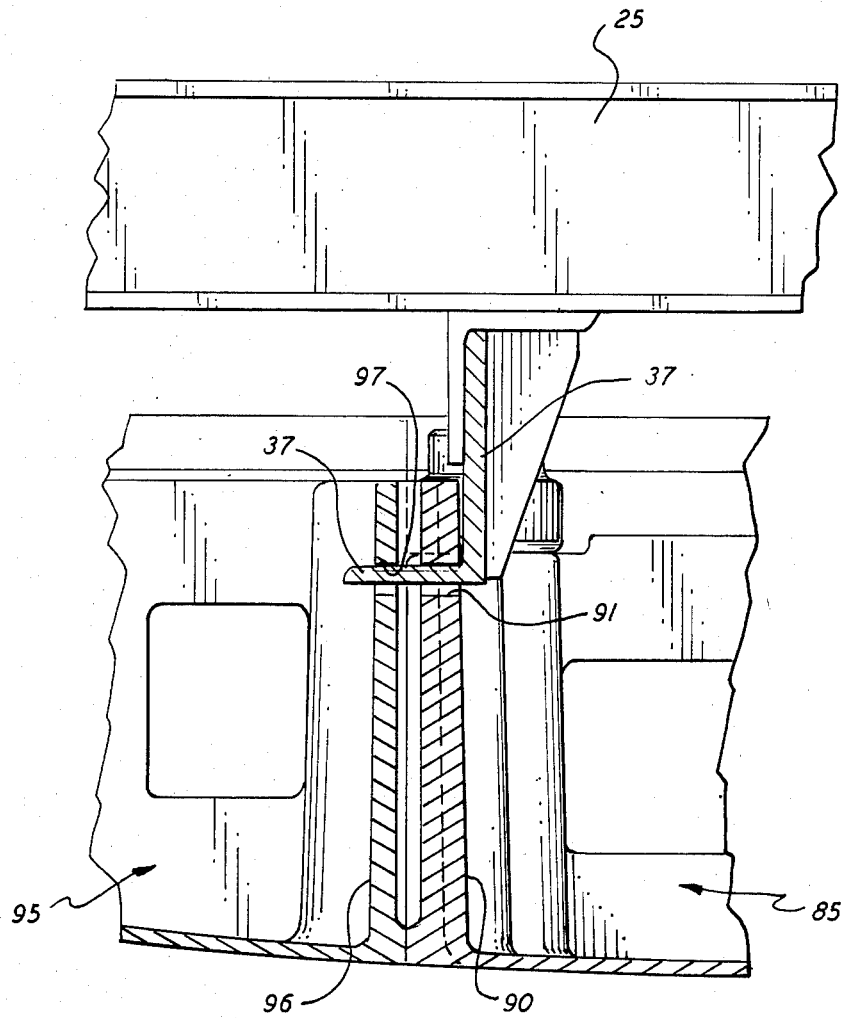
FIG. 21 is an enlarged fragmentary section of one support frame bracket with dam segments thereon.

The next step in the installation of the nozzle dam assembly of the invention is generally illustrated in FIG. 7. It involves placement of an upper dam segment 95 transverse to the cross bars 23 to 25. In FIG. 21 the upper dam segment 95 is shown with a flat side 96 which registers with the flat side 90 of the central dam segment 85. A slot 97 is formed in the flat side 96 of the upper dam segment 95 and receives the bracket 37. The bracket 38 extends through a similar slot which registers with the slot 92 on the central dam segment 85. Three studs 99, one of which is visible in FIG. 7, extend upwardly from the respective three mounting holes 100, 101 and 102 which appear on the upper dam segment 95 in FIG. 11 to position the upper edge of the upper dam segment and to transmit under compression any load on the frame 23 directed axially out of the nozzle 11 into the head 13.

The next step is to secure the dam segments together with certain ball-lock pins and in this regard reference should be had to FIGS. 11, 22 and 23. Extending from the top of the flat wall 72 of the lower dam segment 71 are four bosses 101, 102, 103 and 104. Similarly four bosses 105, 106, 107 and 108 extend from the flat wall 96 of the upper dam segment 95. In the assembly of the dam, each of these bosses mates with an underlying boss on the central dam segment 85. FIGS. 22 and 23 illustrate the boss 105 on the upper dam segment 95 together wall a ball-lock assembly 109 associated therewith. Its construction typifies that of each of the other bosses.

The ball-lock pin itself is a standard available device of double-acting form, which is to say when its handle 110 is either pushed or pulled the pin releases from its position. In FIG. 22 its parts are shown in full lines to illustrate its retracted position. By pushing the handle balls 111 are radially retracted so that the shank 112 can pass through a cylindrical insert 113 in the boss 105 and then through an aligned cylindrical insert 114 in the central dam segment 85. In its innermost position, in which the handle 110 is shown in dotted lines, the ball 111 has traveled to the dotted line position and the balls have displaced to their outer position to lock the pin in place. A pull on the handle 110 will cause the balls to retract so that the pin can be released.

The only significant difference between a standard design of the ball-lock pin available as a stock item and that employed for the four inner ball-lock pins operating in the holes 102, 103, 106 and 107 and the four outer ball-lock pins operating in the holes 101, 104, 105 and 108 is that each has a roll pin 117 located in an insert 118 which "rolls" against a flat groove 119 in the shank 109 of the device. Thus the ball-lock pin shank 109 cannot be retracted further than the position shown in solid lines in FIG. 22 because the bottom end of the flat groove 119 is at that point stopped by the roll pin 117. It is the purpose of the limiting roll pin 117 to prevent the ball-lock pin from being removed from its position on each respective boss on the lower and upper dam segments 71 and 95, so that there is no inadvertent displacement of parts within the steam generator. With the dam in its open or upward position as shown in FIG. 7, the operator inside the generator 12 standing on the step 21 can reach around behind the dam and manipulate into locked position the outer ball-lock pins located in the bosses 101, 104, 105 and 108.

It will be evident from the drawings that the three dam segments 71, 85 and 95 together comprise a circular dish-shaped structure having a flared rim corresponding in shape and just slightly smaller to the nozzle 17 of the pipe 11. The convex face of the structure formed by the three dam segments is smooth and rounded.

Figure 12:
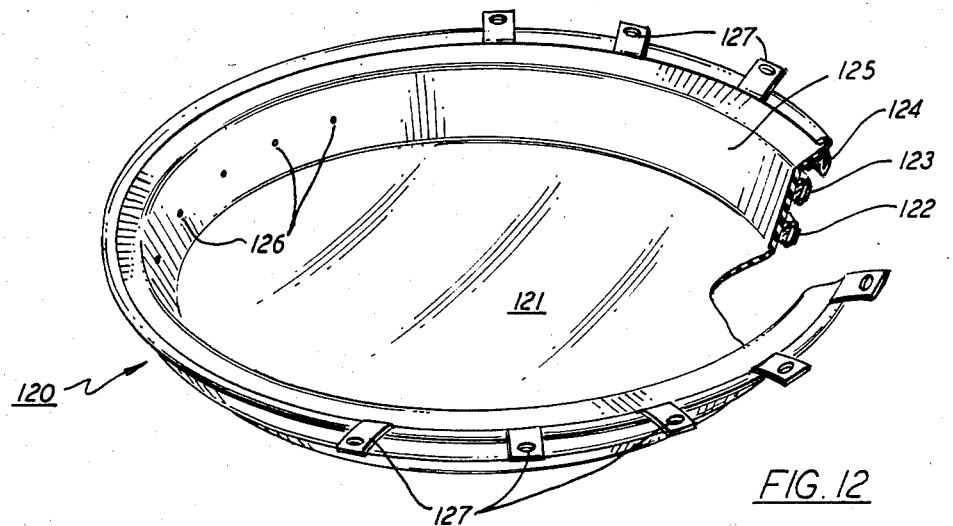
FIG. 12 is a perspective view, partly broken away showing the sealing diaphragm with its peripheral sealing means.
Figure 13:
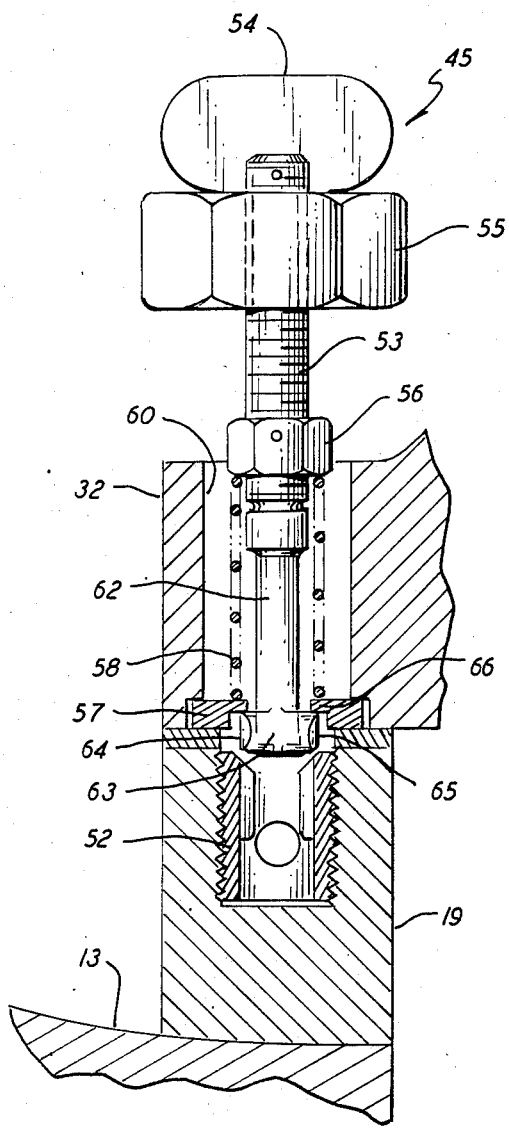
FIG. 13 is an enlarged fragmentary section of one of the bayonet pin means and socket insert in its unlocked position.

Referring now to FIG. 7, a sealing diaphragm 120 is illustrated partially attached to the upper dam segment 95. As shown in FIG. 12, it is formed of a central membrane 121 for covering the entire convex face of the dish-shaped multi-segment dam, and two redundant, pneumatically inflatable seal rings 122 and 123 and one passive back-up seal 124 which are vulcanized to a rim portion 125 integral with the central membrane 121. All of these are fabricated from radiation-resistant ethylene propylene diene monomer (EPDM). A resilient EPDM sponge pad is bonded to the sealing face of each inflatable ring 122 and 123 to insure proper engagement against the relatively rough stainless steel nozzle surface. The inflatable seals are independently pressurized through separate hoses from a control console located outside the steam generator 12. Plant air at 90 PSIG is the primary pressure source and individual compressed air bottles may be employed as a reserve. The hoses which pass through the open manways are steel reinforced and are provided with appropriate check valves to assure maintenance of pressure in the event of hose failure. A quick-connect is provided to release seal pressure prior to removal of the dam.

A leak detection alarm system may be provided consisting of an air hose connected to a port between the two inflatable seals. The detection system allows pressure decay testing following installation of the dam but prior to actual flooding. In addition a nominal pressure may be established between the inflatable seals to act as a reference; an increase in pressure will indicate an upstream leak while a decrease will indicate a downstream leak.

Figure 24:
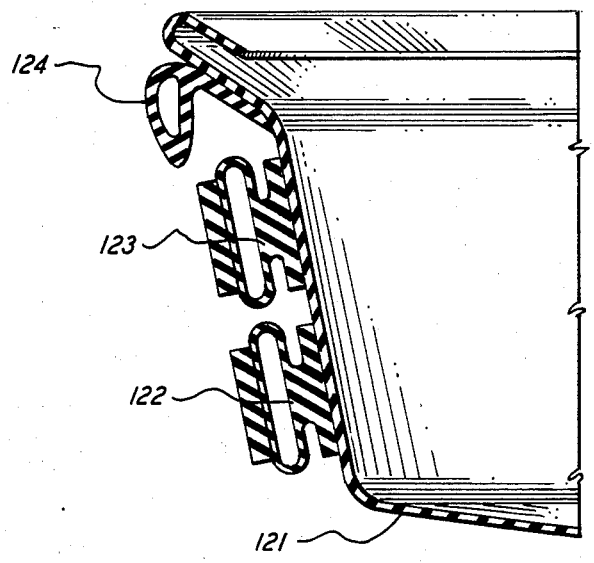
FIG. 24 is an enlarged fragmentary section of the sealing means on the periphery of the dam.

The passive seal 124 illustrated in FIG. 12 is a hollow EPDM element of delta-shape which is squeezed against the nozzle wall such that, if subjected to water pressure from gross leakage past the inflatable seals 122 and 123, it tends to press outwardly against the nozzle wall and the rim of the dam. FIG. 24 shows the passive seal 124 and inflatable seals 122 and 123 in more detail.

Referring now to FIG. 12, the diaphragm 120 is attached to the upper dam segment 95 by means of five brass studs 126 which are vulcanized in place and which extend into corresponding holes on the rim portion of the upper dam segment 95. Two of these studs may also serve as the air supply connection of the inflatable seals 122 and 123 and one stud may be the leak detection connection. There are a number of tabs 127 arranged around that portion of the periphery of the diaphragm 120 which can be pulled to stretch the diaphragm over the middle dam segment 85 and lower dam segment 71. This stretched condition of the diaphragm 120 covering the dam segments is illustrated FIGS. 8 and 9.

Figure 9:
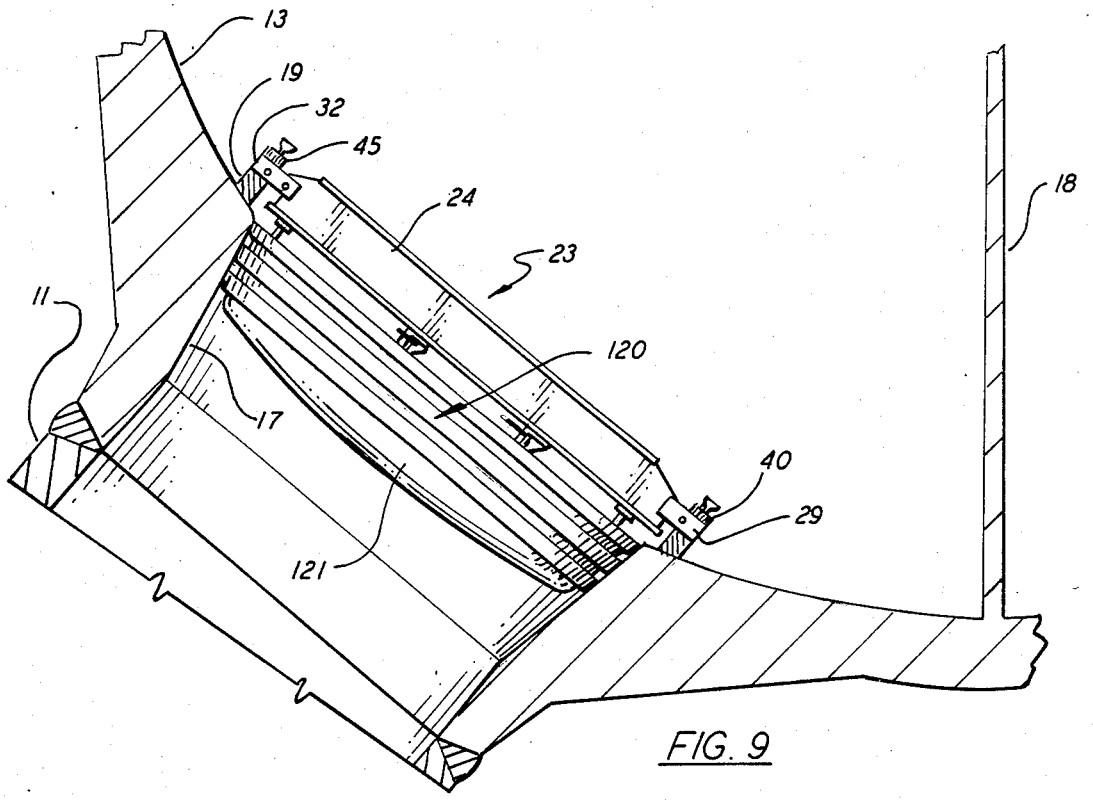
FIG. 9 is a similar view with the dam rotated into operating position prior to inflation of the peripheral sealing means of the diaphragm.

Finally, the parts catcher 20 is removed and the dam is rotated into place as shown in FIG. 9. The upper bayonet pins 46 to 49 and then the inner ball-lock pins on the bosses 102, 103, 106 and 107 are secured. The seal rings 122 and 123 are then inflated and leak-checked from outside the steam generator.

The scope of the invention is to be determined from the claims rather than the foregoing description of one preferred embodiment.

We claim:

1. In a nozzle dam assembly which includes a chamber and a wall defining part of the chamber, a circular opening in the wall, a nozzle communicating with the chamber through the circular opening in the wall, and a flange ring affixed to the wall around the opening, the improvement which comprises
    a. a support frame adapted to span the ring,
    b. a plurality of bayonet pins adapted to lie parallel to the nozzle axis for making a non-threaded releasable connection between the frame and ring and for carrying under tension any load on the frame directed axially out of the nozzle,
    c. a circular dam attachable to the frame and having a rim disposable within the nozzle,
    d. a sealing diaphragm disposable over the dam and around the rim of the dam, and
    e. inflatable peripheral sealing means on the diaphragm disposable around the dam rim for effecting a continuous circumferential seal around the nozzle independent of the aforementioned axial load.

2. A nozzle dam assembly according to claim 1 wherein the support frame is collapsible and comprises cross bars adapted to span the ring and cross arms pivotably and pantographically attached to the cross bars.

3. A nozzle dam assembly according to claim 2 wherein the cross bars comprise a central cross bar adapted to span the ring diameter and two outer cross bars on opposite sides of the central cross bar adapted to span chords of the ring.

4. A nozzle dam assembly according to claim 1 wherein the inflatable peripheral sealing means on the diaphragm comprises a pair of redundant pneumatically inflatable annular seals, and a passive non-inflatable annular seal is provided on the diaphragm redundant to the inflatable seals.

5. A nozzle dam assembly according to claim 1 wherein certain of the bayonet pins are hingeably mounted to the frame so that the frame can be swung between open and closed positions with respect to the ring when those certain bayonet pins are secured in relation to the ring.

6. A nozzle dam assembly according to claim 1 wherein inserts with non-threaded sockets are affixed to the ring to receive the respective bayonet pins.

7. A nozzle dam assembly according to claim 1 wherein the bayonet pins are spring-loaded into open position and are irremovably connected to the frame.

8. A nozzle dam assembly according to claim 1 wherein
   a. the dam comprises
      i. at least two dam segments,
      ii. locating means on the segments for correctly positioning them in registry during assembly,
      iii. quick-disconnect lock means on the segments for securing them together, and
      iv. load-transmitting means on the segments for carrying under compression any load on the frame directed axially out of the nozzle into the chamber; and
   b. bracket means are provided on the frame for supporting the dam segments as they are positioned in registry.

9. A nozzle dam assembly according to claim 8 wherein the dam comprises a central segment and lower and upper segments locatable to each side thereof, the lock means are ball-lock devices irremovably attached to the dam segments, and the load-transmitting means are adjustable studs mounted in the upper and lower segments to be engagable with the frame.

10. In a nozzle dam assembly which includes a chamber and a wall defining part of the chamber, a circular opening in the wall, a nozzle communicating with the chamber through the circular opening in the wall, a flange ring affixed to the wall around the opening, and a dam with a sealing diaphragm attachable to the ring to seal the opening, the improvement which comprises
   a. a collapsible support frame for the dam comprising
      i. cross bars adapted to span the ring, and
      ii. cross arms pivotably and pantographically attached to the cross bars; and
   b. releasable pin means for making a non-threaded connection between the frame and ring and for carrying under tension any load on the frame directed axially out of the nozzle comprising
      i. respective bayonet pins on the ends of the cros bars adapted to be parallel to the nozzle axis.

11. A nozzle dam assembly according to claim 10 wherein certain of the bayonet pins are hingeably mounted to the frame so that the frame can be swung between open and closed positions with respect to the ring when those certain bayonet pins are secured in relation to the ring.

12. A nozzle dam assembly according to claim 10 wherein inserts with non-threaded sockets are affixed to the ring to receive the bayonet pins.

13. A nozzle dam assembly according to claim 10 wherein the bayonet pins are spring-loaded and are irremovably connected to the frame.

14. In a nozzle dam assembly which includes a chamber and a wall defining part of the chamber, a circular opening in the wall, a nozzle communicating with the chamber through the circular opening in the wall, and a flange ring affixed to the wall around the opening, and a dam with a sealing diaphragm attachable to the ring to seal the opening, the improvement which comprises
   a. a collapsible support frame for the dam comprising
      i. one central cross bar adapted to span the ring diameter,
      ii. two outer cross bars on opposite sides of the central cross bar adapted to span chords of the ring, and
      iii. cross arms pivotably and pantographically attached to the cross bars; and
   b. releasable pin means for making a non-threaded connection between the frame and ring and for carrying under tension any load on the frame directed axially out of the nozzle comprising
      i. respective bayonet pins on the ends of the cross bars adapted to be parallel to the nozzle axis,
      ii. certain of the bayonet pins being hingeably mounted to the frame so that the frame can be swung between open and closed positions with respect to the ring when those certain bayonet pins are secured in relation to the ring,
      iii. all of the pins being spring-loaded into open position and irremovably connected to the frame, and
      iv. inserts with non-threaded sockets affixed to the ring to receive the bayonet pins.

15. In a nozzle dam assembly which includes a chamber and a wall defining part of the chamber, a circular opening in the wall, a nozzle communicating with the chamber through the circular opening in the wall, a flange ring affixed to the wall around the opening, support frame cross bars adapted to be releasably connected to and span the ring, and a sealing diaphragm adapted to seal the opening, the improvement which comprises
   a. a circular dam to which the sealing diaphragm is attachable comprising
      i. at least two dam segments,
      ii. locating means on the segments for correctly positioning them in registry during assembly,
      iii. quick-disconnect lock means on the segments for securing them together, and
      iv. load-transmitting means on the segments for carrying under compression any load on the frame cross bars directed axially out of the nozzle; and
   b. bracket means provided on the frame for supporting the dam segments as they are positioned in registry.

16. A nozzle dam assembly according to claim 15 wherein the dam segments are positionable transverse to the frame cross bars.

17. A nozzle dam assembly according to claim 16 wherein the dam comprises a central segment and lower and upper segments locatable to each side thereof, the lock means are ball-lock devices irremovably attached to the dam segments, and the load transmitting means are adjustable studs mounted in the upper and lower segments to be engagable with the frame cross bars.

* * * * *